(12) United States Patent
Chang et al.

(10) Patent No.: US 6,823,093 B2
(45) Date of Patent: Nov. 23, 2004

(54) TUNABLE MICRO-OPTIC ARCHITECTURE FOR COMBINING LIGHT BEAM OUTPUTS OF DUAL CAPILLARY POLARIZATION-MAINTAINING OPTICAL FIBERS

(75) Inventors: Kok-Wai Chang, Los Altos, CA (US); Qingdong Guo, Sunnyvale, CA (US); Long Yang, Union City, CA (US); Gonzalo Wills, Ottawa (CA)

(73) Assignees: JDS Uniphase Corporation, San Jose, CA (US); JDS Uniphase Inc., Ottawa (CA)

( * ) Notice: Subject to any disclaimer, the term of this patent is extended or adjusted under 35 U.S.C. 154(b) by 239 days.

(21) Appl. No.: 10/166,823

(22) Filed: Jun. 11, 2002

(65) Prior Publication Data

US 2003/0228082 A1 Dec. 11, 2003

(51) Int. Cl.⁷ .................................................. G02B 6/00
(52) U.S. Cl. .......................................... 385/11; 385/126
(58) Field of Search .............................. 385/11, 14, 24, 385/31–34, 78, 126, 47, 79, 80; 359/124, 131

(56) References Cited

U.S. PATENT DOCUMENTS

| | | | |
|---|---|---|---|
| 6,055,104 A | * | 4/2000 | Cheng .......................... 359/495 |
| 6,275,637 B1 | * | 8/2001 | Chang et al. ................ 385/126 |
| 6,373,631 B1 | * | 4/2002 | Huang et al. ................ 359/496 |
| 6,560,378 B1 | * | 5/2003 | Liu et al. ....................... 385/11 |

* cited by examiner

*Primary Examiner*—Karl D. Frech
(74) *Attorney, Agent, or Firm*—Allen, Dyer, Doppelt, Milbrath & Gilchrist, P.A.

(57) ABSTRACT

A tunable PM fiber combiner is configured to be accurately alignable with and operative to combine into a single composite beam a pair of non-collimated, orthogonally polarized light beams transported over polarization maintaining (PM) optical fibers, whose mutual spatial separation may vary. The combiner includes birefringent elements, that are linearly or rotationally displaced to realize the composite beam. The resulting composite light beam may then be readily coupled (e.g. via a single mode fiber) to a downstream beam processing device, such as a Raman amplifier.

18 Claims, 6 Drawing Sheets

BIREFRINGENT WALK-OFF CRYSTAL

TUNABLE MICRO-OPTIC ARCHITECTURE FOR COMBINING LIGHT BEAM OUTPUTS OF DUAL CAPILLARY POLARIZATION-MAINTAINING OPTICAL FIBERS

FIELD OF THE INVENTION

The present invention relates in general to optical communication systems and components therefor, and is particularly directed to a new and improved, tunable micro-optic architecture for combining non-collimated, orthogonally polarized light beams transported over polarization maintaining (PM) optical fibers, whose mutual spatial separation may vary, as in the case of fibers contained in a dual capillary structure, so as to produce a single composite output beam that may be readily coupled to a downstream single beam processing device, such as a Raman amplifier.

BACKGROUND OF THE INVENTION

A variety of optical signal processing applications require amplification of one or more optical information beams, such as a pair of laser beams transported over a dual fiber supporting capillary. Non-limiting examples of a dual optical fiber capillary structure are shown in the diagrammatic cross sectional views of FIGS. 1, 2 and 3, which depict respective rectangular, dual circular and 'FIG. 8' configurations. As shown therein, each dual fiber capillary has a pair of optical fiber-supporting bores 11 and 12, in which associated optical fibers are fixedly retained by a suitable adhesive (e.g., epoxy) 13 within a shaped bore 14 of a surrounding glass capillary 15. In this type of structure, it is common practice to transport beams of different polarizations over the respective fibers installed within the bores 11 and 12.

For this purpose, each fiber may comprise a polarization-maintaining (PM) fiber structure, shown in cross-section in FIG. 4 as having a signal-transporting glass core 41, embedded at a central axis 42 within a surrounding cladding 43. As a non-limiting example, the fiber's central core 41 may have a diameter on the order of 10 microns (with an on-central axis tolerance on the one micron), while the surrounding cladding 43 may have a diameter on the order of 125 microns (+/–three microns). Embedded within the cladding 43 and equidistantly spaced apart along the central glass core's 'slow' axis 44 (which is orthogonal to its fast axis 45) are a pair of stress rods 46 and 47 (typically referred to 'Panda eyes). These stress rods are used to introduce birefringence into the core area so as to maintain the polarization of the light beam being transported along the central core 41.

In an effort to maximize processing or interfacing flexibility for the two beams being transported by a dual fiber capillary structure with a downstream single beam-based device, such as but not limited to a beam combiner for a Raman amplifier, a pair of PM fibers are typically installed in the two fiber-supporting bores of a dual capillary structure, such that their Panda-eyes and therefore the associated polarization directions of the (laser) beams in the cores are mutually orthogonal to one another, as diagrammatically illustrated at 48 and 49 in FIG. 5.

Now although such a mutually orthogonal, intra-capillary fiber orientation provides the desired difference in polarization in the respective fiber cores, efficiently combining the beams carried by the cores depends on how well the parameters of a combining device coupled thereto is able to accommodate fiber-to-fiber separation between the cores, which varies not only with capillary separation, but also with differences in the parameters of the Panda-eyed fiber structures epoxied within the two bores. Namely, if the beam combiner is designed for a fiber separation that is different from that of the dual capillary structure with which the combiner is actually used, the degree of spatial overlap of the two beams along a combining axis will be degraded, which can result in a substantial loss in one or both polarization components of the composite output beam.

SUMMARY OF THE INVENTION

Pursuant to the invention, this potential misalignment problem is successfully addressed by a new and improved, tunable PM fiber combiner, which is configured to be accurately alignable with and is operative to combine into a single composite beam a pair of non-collimated, orthogonally polarized light beams transported over polarization maintaining (PM) optical fibers, whose mutual spatial separation may vary. The resulting composite light beam may then be readily coupled (e.g. via a single mode fiber) to a downstream unitary beam processing device, such as a Raman amplifier.

In a first embodiment, a pair of birefringent walk-off crystal wedges that form a generally 'rectangular' combiner are cascaded along the beam travel directions of mutually polarized light beams output from respective fibers of a dual fiber capillary, such as a dual 'Panda-eyed' capillary structure. The two wedges are displaceable relative to one another in directions either generally transverse or parallel to the optical beam path, so that the combined walk-off distance of the crystal wedges is adjustable, in order to 'tune' the effective optical path length of the wedges, and accommodate variations in fiber core-to-fiber core separation within a dual 'Panda-eyed' capillary structure. In a second embodiment, a pair of birefringent walk-off crystal wedges are cascaded into a generally 'non-rectangular' tunable combiner.

A third embodiment employs a pair of fixed length, angularly adjustable, walk-off 45° crystals, that are arranged to intercept a pair of light beams from a dual capillary optical fiber structure having mutually orthogonal Panda-eyes spatially oriented at +45° and −45° relative to a line passing through their respective fiber cores. The effect of this mutual +/−45° angular spatial orientation of the two fibers is to have their slow axes intersect at 90° at a location within the cladding of the dual fiber capillary proximate to but slightly spaced apart from the two fibers. For a nominal separation $D_o$ between the fiber cores, the walk-off distance required to achieve aligned overlap of the mutually orthogonal beams within the cores is on the order of $1.414*D_o$. Each walk-off crystal has a thickness that provides a nominal walk-off of $1.414*D_o$ for a prescribed beam polarization orientation relative to respective walk-off axes between beam input and exit output faces.

The adjustability of the angular orientations of the crystals about the optical axes of the two beams incident on the crystals compensates for a departure in actual fiber-to-fiber separation $D_o$ from the nominal value of $D_o$ for different dual capillary structures. For a larger than nominal separation ($D > D_o$), the crystals may be rotated to increase the angle between their walk-off axes and a line through their cores to values larger than +/−45°, and thereby realize exact coincident overlap of the two mutually orthogonally polarized light beams emanating from the fiber cores at an increased distance walk-off axis intersection location. For a smaller than nominal separation ($D < D_o$), the crystals may be rotated to decrease the angle between their walk-off axes and a line through their cores to values smaller than +/−45°, so as to cause exact coincident overlap of the two mutually orthogonally polarized light beams emanating from the fiber cores at a relatively closer than nominal walk-off axis intersection location.

A fourth embodiment of the invention employs a Wollaston prism, which is coupled to the dual capillary PM fiber by way of a lens, such as a gradient refractive index (GRIN) lens and a glass spacer. The glass spacer may be bonded to either the terminating face of the PM capillary or the GRIN lens. The two beams from the dual fiber capillary are directed by the GRIN lens at respective complementary angles of divergence into the Wollaston prism, depending upon the pitch of the GRIN lens. For a given core-to-core spacing for mutually orthogonally oriented fibers, and a GRIN lens having a prescribed pitch, the divergence angle of each beam from the GRIN lens may be readily calculated and converted by the Wollaston prism into a composite output beam containing both polarizations. Optically downstream of the Wollaston prism is a further GRIN lens and associated glass spacer that couples the output of the GRIN lens into an output fiber coupler terminating an individual PM or single mode fiber.

DETAILED DESCRIPTION

Figure 1:
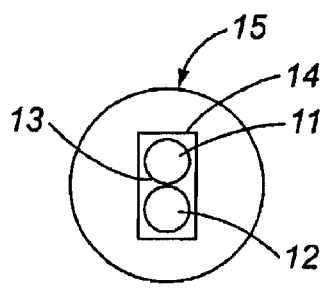
FIGS. 1, 2 and 3 are diagrammatical cross-sectional views of respective rectangular, dual circular and 'FIG. 8' configurations of a dual optical fiber capillary structure.
Figure 2:
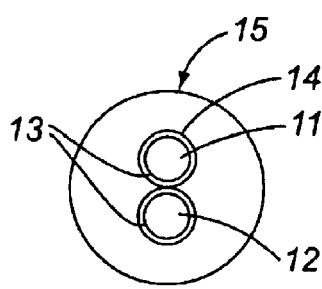
Figure 3:
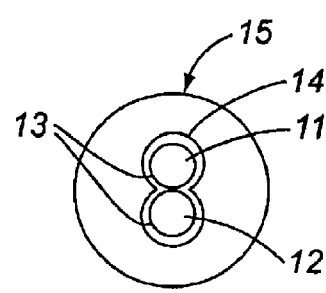
Figure 4:
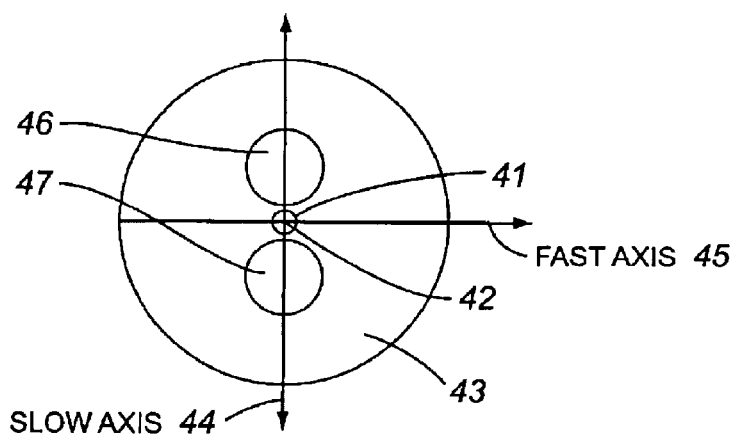
FIG. 4 is a diagrammatic cross-sectional view of a polarization-maintaining (PM) fiber structure.
Figure 5:
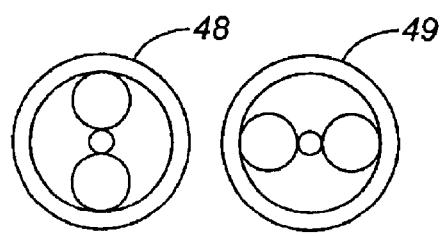
FIG. 5 diagrammatically illustrates a dual capillary Panda-eye fiber structure.

A first embodiment of the fiber separation-compensating PM beam combiner of the present invention is shown diagrammatically in FIG. 6 as comprising a pair of mutually displaceable birefringent walk-off crystal wedges 50 and 60 optically coupled in cascade along the beam travel directions of a pair of mutually polarized light beams supplied by respective fibers of a dual fiber capillary 10, such as the dual 'Panda-eyed' capillary structure of FIG. 5, described above, and shown in cross-section in FIG. 6. As non-limiting examples, the walk-off crystal wedges may comprise rutile ($TiO_2$) yttrium orthovanadate ($YVO_4$), calcite and the like. As will be described, these crystal wedges are configured and arranged so that their combined walk-off distance may be adjusted in a manner that effectively 'tunes' the combiner to accommodate variations in fiber core-to-fiber core separation within a dual 'Panda-eyed' capillary structure.

Figure 7:
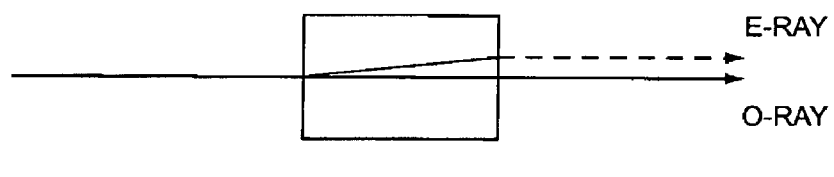
FIG. 7 diagrammatically illustrates the reversible optical behavior of a 'walk-off' crystal.

As diagrammatically illustrated in FIG. 7, due to its birefringent properties, the (reversible) optical behavior of a 'walk-off' crystal provides spatial separation of respective orthogonal components (e.g., ordinary (o) and extraordinary (e) rays) of an incident light beam, the degree and direction of separation depending upon the parameters of the crystal (including length and entrance and exit face orientations relative to the crystal's optical plane) as well as the angle of incidence of the incoming beam.

Figure 8:
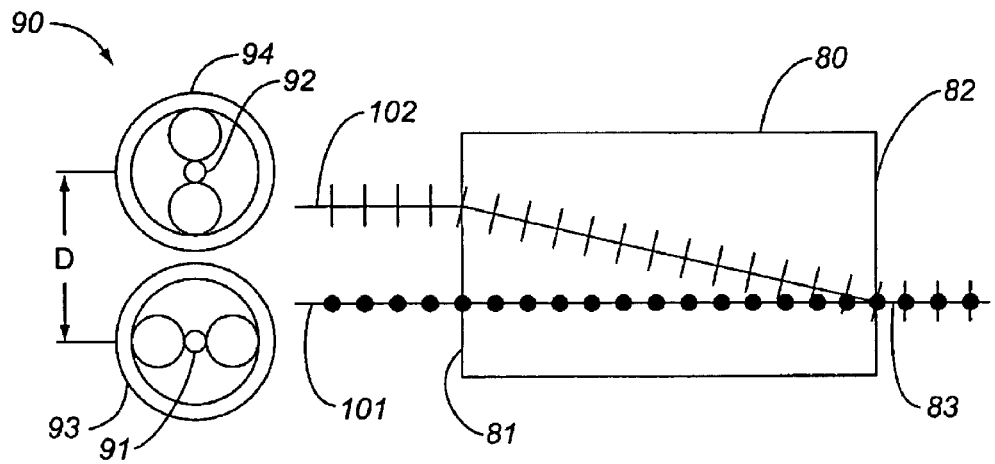
FIG. 8 shows a generally rectangularly-shaped walk-off crystal coupled to a pair of two fibers of a dual 'Panda-eyed' capillary structure.

FIG. 8 shows an ideal case where the parameters of a generally rectangularly-shaped walk-off crystal 80 are defined in accordance with an a priori known separation D between respective cores 91 and 92 of a pair of two fibers 93 and 94 of a dual 'Panda-eyed' capillary structure 90. In this example, a beam 101 from the fiber core 91 has a first polarization parallel to the fast axis of the core 91 and normal incidence upon the input face 81 of the crystal 80. As such, beam 101 travels straight through the crystal 80 along its incidence direction and exits normally to location 83 of crystal exit face 82. On the other hand, beam 102 from the fiber core 92 has a second polarization parallel to the slow axis of the core 92 and normal incidence upon the input face 81 of the crystal 80. Due to the birefringence of the crystal, orthogonally polarized beam 102 is displaced or 'walks off' as it travels through the crystal 80. With the geometric parameters (including length) of the crystal 80 having been defined in accordance with the known spatial separation between the two fiber cores 91 and 92, beam 102 exits normally to the same location 83 of the crystal exit face 82, as the exit location of beam 101. As a result, walk-off crystal 80 is able to effectively combine two mutually orthogonally polarized beams provided by the fiber cores of the dual fiber capillary into a single output beam.

Figure 9:
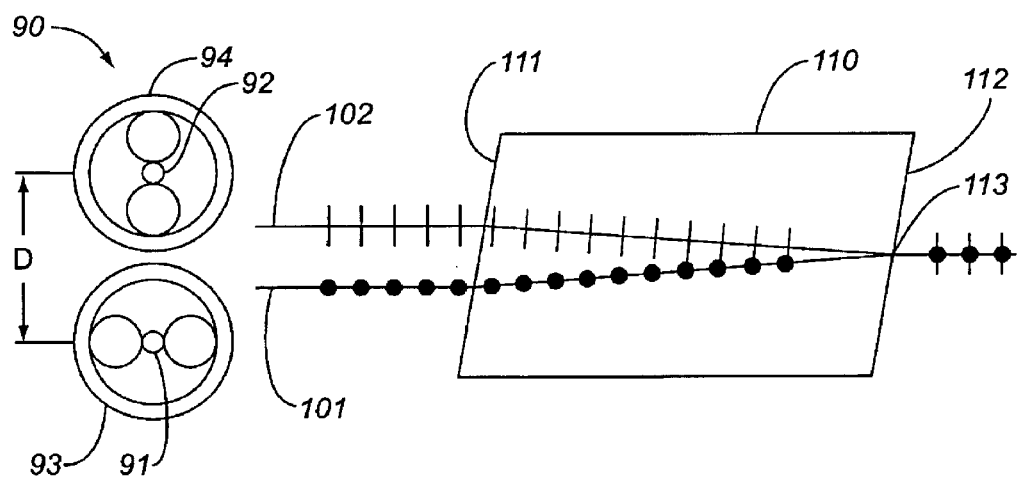
FIG. 9 shows a generally non-rectangularly-shaped walk-off crystal coupled to a pair of two fibers of a dual 'Panda-eyed' capillary structure.

FIG. 9 shows a similar ideal case where the parameters of a non-rectangular walk-off crystal 110 are also precisely defined in accordance with an a priori known separation D between respective cores 91 and 92 of fibers 93 and 94 of the dual 'Panda-eyed' capillary structure 90. In this non-rectangular crystal example, the beam 101 from the fiber core 91 having the first polarization parallel to the fast axis of the core 91 has non-normal incidence upon an input face 111 of the crystal 110. As a result, beam 101 is displaced or 'walks off' as it travels through the crystal 110 and exits at location 113 of crystal exit face 112. In a complementary manner, beam 102 from fiber core 92 having a second polarization parallel to the slow axis of the core 92 has non-normal incidence upon input face 111 of crystal 110, so that it also 'walks off' as it travels through the crystal 110. Again, the geometric parameters (including length) of the crystal 110 are defined in accordance with the known spatial separation between the two fiber cores 91 and 92, so that each of the beams 101 and 102 will exit the same location 113 of the crystal exit face 112 and travel in the same direction as their parallel directions of incidence, producing a combined output beam.

Figure 6:
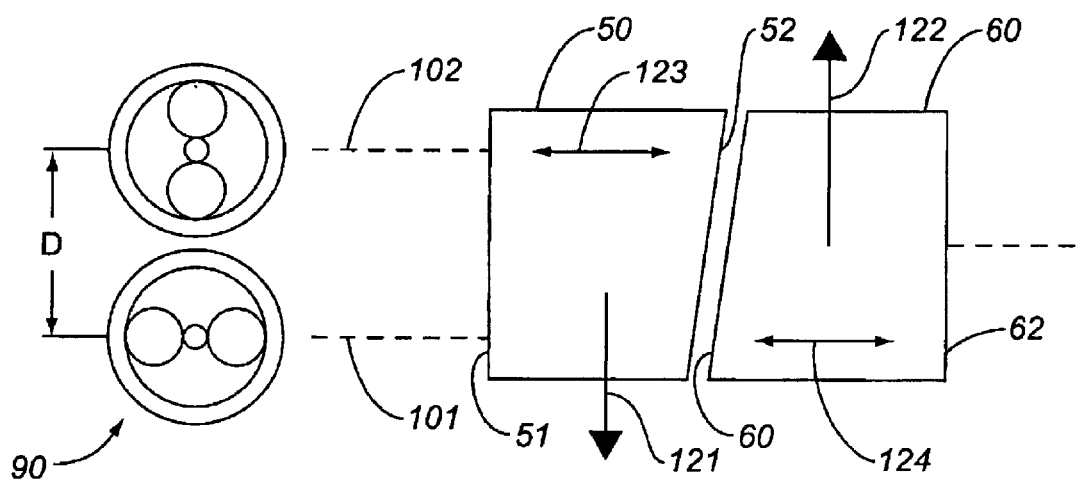
FIG. 6 diagrammatically illustrates a first embodiment of the fiber separation-compensating PM beam combiner of the invention as a generally rectangularly-shaped walk-off crystal, subdivided into a cascaded pair of mutually displaceable birefringent walk-off crystal wedges.

In accordance with the first embodiment of the invention, shown in FIG. 6, referenced above, the generally rectangular walk-off crystal 80 of FIG. 7 is subdivided into a pair of walk-off crystal wedges 50 and 60, one or both of the wedges being displaceable, either in a direction orthogonal or parallel to the direction of incidence of the two beams 101 and 102. In the illustrated embodiment, both wedges may be displaceable in mutually complementary directions, such as orthogonal to the direction of incidence of beams 101 and 102 (or in the walk-off direction), as shown by arrows 121 and 122 or parallel to the direction of the beams, as shown by arrows 123 and 124. This mutual displaceability provides for adjustment of the effective thickness (optical length) of the crystal, so that its walk-off distance may be effectively 'tuned' to accommodate variations in fiber core-to-fiber core separation within the dual 'Panda-eyed' capillary structure 90.

For this purpose, an input or optically upstream crystal wedge 50 has a generally planar front face 51 upon which each of the mutually orthogonally polarized beams 101 and 102 from the dual fiber capillary has normal incidence. Wedge 50 also has a generally planar rear face 52 that is inclined relative to its front face 51. In a complementary manner, an optically downstream crystal wedge 60 has a generally planar front face 61 upon which the beams 101 and 102 passing through wedge 50 are incident, and which is parallel and juxtaposed to the rear face 52 of crystal wedge 50. Crystal wedge 60 also has a generally planar rear face 62 that is inclined relative to its front face 61, and is parallel to the front face 51 of crystal wedge 50.

As can be seen from an examination of subdivided walk-off crystal architecture of FIG. 6, translating either or both of the two crystal wedges 50 and 60 in directions parallel to the arrows 121, 122 or arrows 123, 124 will change the axial separation between their mutually adjacent inclined faces 52-61, and thereby the amount of walk-off of the beam 102 through the two wedges. As pointed out above, this adjustability means that the combiner of the invention can accommodate a variation in fiber-to-fiber separation among different dual capillary structures.

Figure 10:
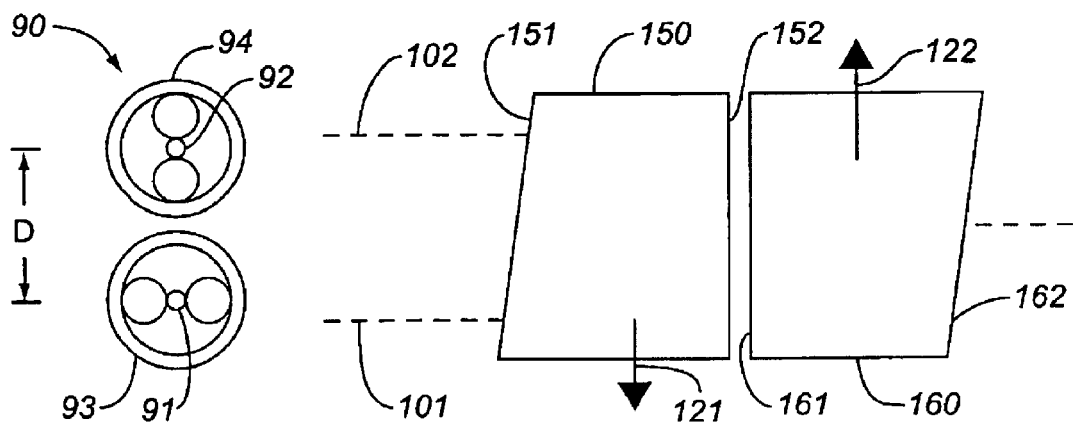
FIG. 10 shows a second embodiment of the invention, wherein the non-rectangular walk-off crystal of FIG. 9 is subdivided into a pair of displaceable walk-off crystal wedges.

FIG. 10 shows a second embodiment of the invention, wherein the non-rectangular walk-off crystal structure 110 of FIG. 9 is subdivided into a pair of walk-off crystal wedges 150 and 160, one or both of which are displaceable in a direction orthogonal to the direction of incidence of the two beams 101 and 102, as in the first embodiment. In the embodiment of FIG. 10, an optically upstream or input crystal wedge 150 has a generally planar front face 151 that is inclined (non-normal incidence) relative to each of the mutually orthogonally polarized beams 101 and 102 from the dual fiber capillary. Wedge 150 also has a generally planar rear face 152 that is non-paralles to its front face 151 and is orthogonal to the input direction of beams 101, 102. In a complementary manner, the optically downstream crystal wedge 160 has a generally planar front face 161 upon which the beams 101 and 102 passing through wedge 150 are incident, and which is parallel and juxtaposed to the rear face 152 of the crystal wedge 150. The downstream crystal wedge 160 also has a generally planar rear face 162 that is inclined relative to its front face 161, and is parallel to the front face 151 of the crystal wedge 150.

In this embodiment, translating either or both of the crystal wedges 150 and 160 in directions parallel to the arrows 121, 122 will effectively change the overall walk-off distance for each of the two beams 101 and 102 between parallel end faces 151 and 162. As in the embodiment of FIG. 6, this travel path adjustability means that the non-rectangular wedge configuration of FIG. 10 can also accommodate a variation in fiber-to-fiber separation among different dual capillary structures.

Figure 11:
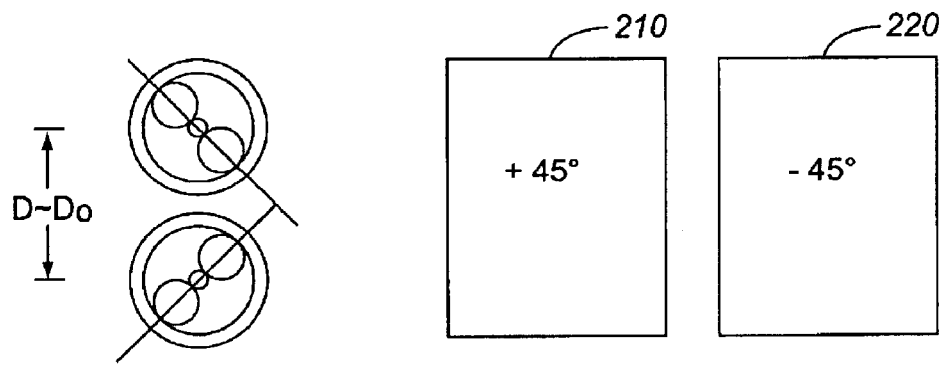
FIGS. 11 and 12 are respective side and end diagrammatic views of a third embodiment of the invention having a pair of a pair of optically cascaded, fixed length walk-off 45° crystals, angular orientations of which are adjustable, to tune the combiner for the fiber-to-fiber separation of a dual capillary structure, having mutually orthogonal Panda-eyes spatially oriented at +45° and −45° relative to a line passing through their respective fiber cores.
Figure 12:
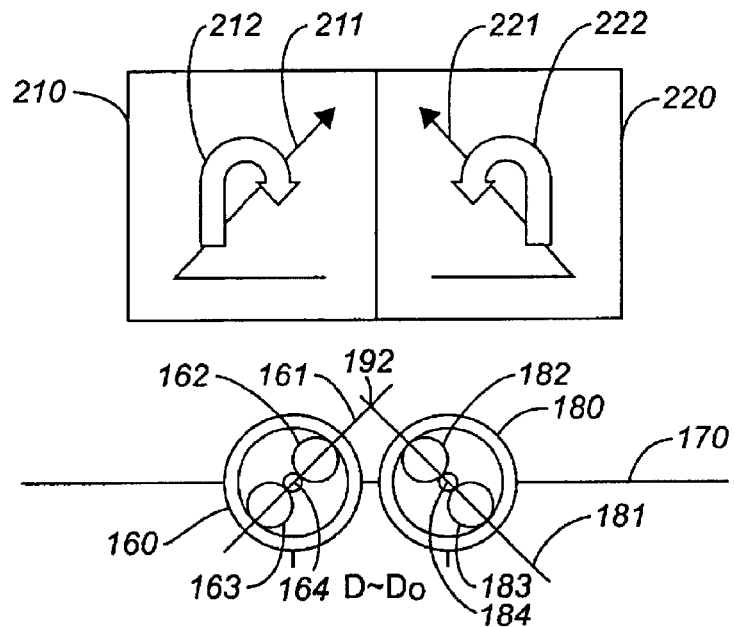

FIGS. 11 and 12 diagrammatically illustrate a third embodiment of the invention, in which the angular orientations of a pair of optically cascaded, fixed length walk-off 45° crystals 210, 220 are adjustable, so as to tune the combiner for the fiber-to-fiber separation of a dual capillary structure, having mutually orthogonal Panda-eyes that are spatially oriented at +45° and −45° relative to a line passing through their respective fiber cores.

Namely, as shown in cross-section of the end view of FIG. 12, the slow axis 161 through respective Panda-eye stress rods 162, 163 of a fiber 160 is geometrically oriented at an angle of +45° relative to a line 170 that passes through fiber core 164 and a fiber core 184 of a fiber 180 within a dual fiber capillary 190. In a complementary manner, the slow axis 181 through respective Panda-eye stress rods 182, 183 of fiber 180 is geometrically oriented at an angle of −45° relative to the line 170.

The intended effect of this mutual +/−45° angular spatial orientation of the two fibers is to have their slow axes 161 and 181 intersect at 90° at a location 192 proximate to but slightly spaced apart from the two fiber cores. For a nominal separation $D_o$ between the fiber cores 164 and 174, the walk-off distance (from the center of each core where the slow and fast axes intersect to location 192) required to achieve aligned overlap of the mutually orthogonal beams within the cores is therefore $D_o*(2)^{-1/2}$ or on the order of $1.414*D_o$. Thus each of walk-off crystals 210, 220 has a thickness that provides a walk-off of $1.414*D_o$ for a prescribed beam polarization orientation relative to its respective walk-off axis between its beam input and exit output faces.

As in the embodiments of FIGS. 6 and 10, however, the actual fiber core separation D is a variable quantity, due to variations in parameters of the dual fiber capillary, as described previously. Pursuant to this third embodiment, compensation for variations in fiber core separation D from its nominal value $D_o$ are achieved by appropriately changing the mutual angular orientations of the optically cascaded walk-off crystals 210 and 220. The upstream +45° walk-off crystal 210 has its crystal axis providing a walk-off direction shown by arrow 211 that is parallel to the slow axis 161 of the fiber 160, and orthogonal to the slow axis 181 of fiber 180. In a complementary manner, the downstream −45° walk-off crystal 220 has its crystal axis providing a walk-off direction shown by arrow 221 that is parallel to the slow axis 181 of the fiber 180, and orthogonal to the slow axis 161 of fiber 160. As pointed out above, the thickness (optical length) of each 45° walk-off crystal is such as to provide a walk-off of $1.414*D_o$ for a prescribed beam polarization orientation relative to its respective walk-off axis between its beam input and exit output faces.

In the arrangement of FIGS. 11 and 12, the angular orientations of the crystals 210 and 220 are variable about the optical axes of the two beams incident on the crystals, as shown by the rotation arrows 212 and 222. As pointed out above, this ability to vary the angular orientation serves to compensate for a departure in actual fiber-to-fiber separation $D_o$ from the nominal value of $D_o$ for different dual capillary structures. In particular, for a larger than nominal separation (D>$D_o$), the crystals are rotated to increase the angle between their walk-off axes 211, 221 and line 170 to values larger than +/−45°, so as to cause exact coincident overlap of the two mutually orthogonally polarized light beams emanating from the fiber cores at an increased distance walk-off axis intersection location 192$_{>Do}$. On the other hand, for a smaller than nominal separation (D<$D_o$), the crystals are rotated to decrease the angle between their walk-off axes 211, 221 and line 170 to values less than +/−45°, so as to cause exact coincident overlap of the two mutually orthogonally polarized light beams emanating from the fiber cores at a closer walk-off axis intersection location 192$_{<Do}$.

Figure 13:
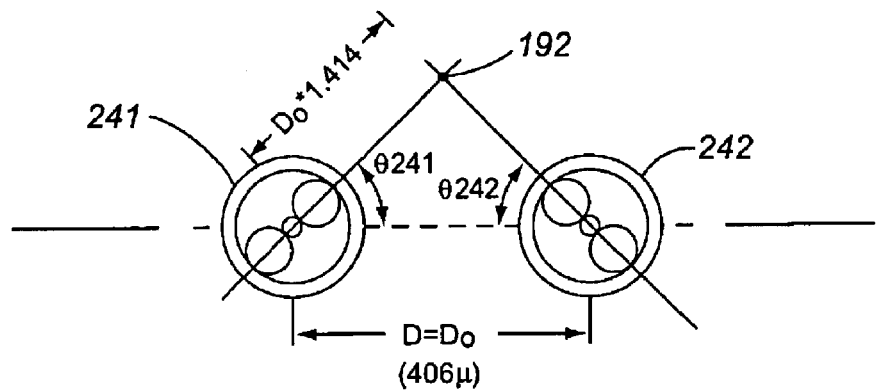
FIGS. 13, 14 and 15 are spatial geometry diagrams of a pair of PM fibers having nominal capillary diameters on the order of 125 microns (+/−3 microns) and a nominal core separation of 406 microns (+/−9 microns)
Figure 14:
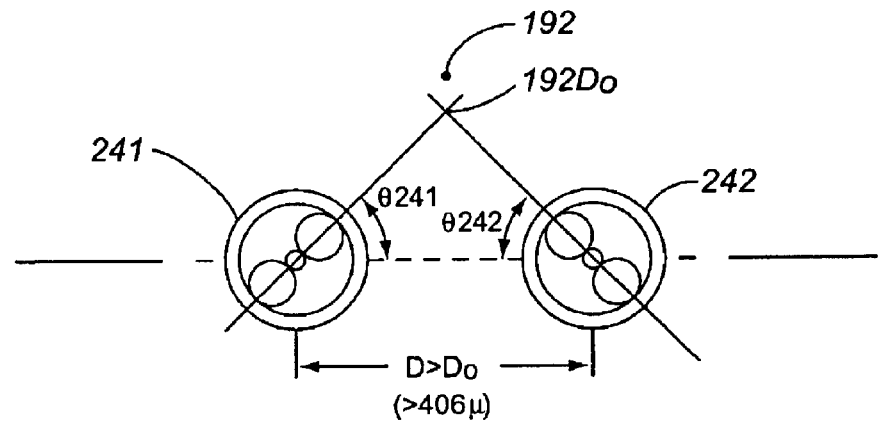
Figure 15:
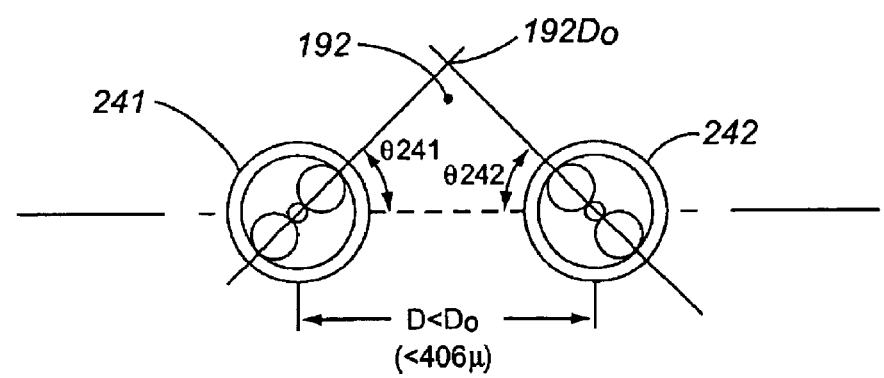

A non-limiting example of this rotational tuning functionality of the embodiment of FIGS. 11 and 12 is diagrammatically illustrated in the spatial geometry diagrams of FIGS. 13, 14 and 15, which show a pair of PM fibers 241 and 242, each having a nominal capillary diameter on the order of 125 microns (+/−3 microns) as described above, and at a nominal core separation $D_o$=406 microns (+/−9 microns). This capillary separation tolerance means that core separation may lie within an 18 micron window of 397 to 415 microns. For this nominal separation $D_o$ of 406 microns, the nominal walk-off distance to location 192$_{Do}$ is 1.414*$D_o$ or 287 microns.

Therefore, for an increased core separation D falling within the upper portion of the tolerance window (406–415 microns), which reduces the values of the angles $\Theta_{241}$ and $\Theta_{242}$ to less than 45°, the crystals 241 and 242 are rotated to increase the angles $\Theta_{241}$ and $\Theta_{242}$ and increase the distance to the walk-off axis intersection location 192$_{>Do}$. Conversely, for a reduced core separation D falling within the lower portion of the tolerance window (397–406 microns), which increases the values of the angles $\Theta_{241}$ and $\Theta_{242}$ to more than 45°, the crystals 241 and 242 are rotated to decrease the angles $\Theta_{241}$ and $\Theta_{242}$ and thereby decrease the distance to the walk-off axis intersection location 192$_{<Do}$.

Figure 16:
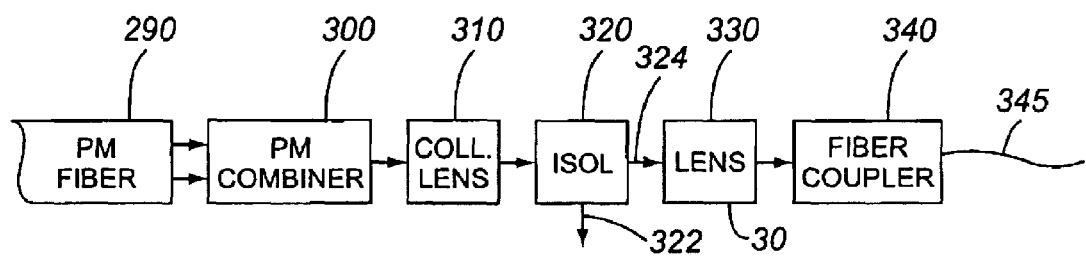
FIG. 16 shows the incorporation of an 'isolator' with the PM combiner of the invention.

FIG. 16 diagrammatically illustrates a non-limiting 'isolator' example of the ability to incorporate additional optical processing components with any of the combiners of the above-described embodiments, without a substantial increase in overall system volume. In the isolator-incorporating arrangement of FIG. 16, the composite beam produced by a PM combiner 300 of the type described above for a dual PM fiber capillary 290 is collimated by a collimating lens 310 and supplied thereby to an optical isolator 320, from which an isolated output beam component 322 may be extracted. The remaining collimated beam component 324 is focussed by a lens 330 into the beam-coupling aperture of an output fiber coupler 340 that terminates an output fiber 345, such a PM fiber or single mode fiber.

Figure 17:
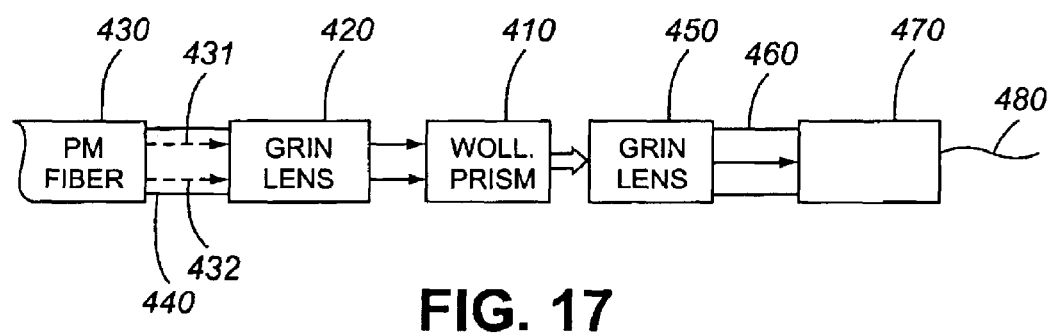
FIG. 17 shows a fourth embodiment of the invention having a Wollaston prism coupled to a dual capillary PM fiber by a gradient refractive index (GRIN) lens and a glass spacer.

FIG. 17 diagrammatically illustrates a fourth embodiment of the invention, in which the parameters of a Wollaston prism 410 are defined in accordance with those of a gradient refractive index (GRIN) lens 420 to which (mutually polarized) output beams 431, 432 from a dual fiber PM capillary 430 are coupled by way of a glass spacer 440. The glass spacer 440 may be bonded to either the terminating face of the PM capillary 430 or the input face of the GRIN lens 420, so as to leave a slight space between the spacer and the other of the GRIN lens and the capillary. The two beams from the dual fiber capillary will be directed by the GRIN lens at respective complementary angles of divergence toward the Wollaston prism, depending upon the pitch of the GRIN lens.

For a core-to-core or beam spacing of 125 microns (+/−3 microns) for fibers mutually orthogonally oriented as illustrated in FIG. 5, referenced above, and a 0.18 pitch GRIN lens having a focal length on the order of 2.13 mm (2130 microns), the divergence angle of each beam from the GRIN lens may be readily calculated to be on the order +/−1.67°. This equal and opposite value of divergence angle is readily converted by a Wollaston prism into a composite output beam containing both (mutually orthogonal) polarizations. Inserted optically downstream of Wollaston prism 410 is a further (like pitch) GRIN lens 450 and associated glass spacer 460 that couples the output of the GRIN lens 450 into an output fiber coupler 470 terminating a (PM or SM) fiber 480. To accommodate variations in fiber spacing within the dual PM fiber capillary, a set of such Wollaston elements of differing crystal parameters may be provided. In effect, this fourth embodiment is statically tunable (by substitution of parts) rather than incorporating a moveable (linearly displaceable as in the first and second crystal wedge embodiments, or angularly adjustable as in the third embodiment) crystal element.

As will be appreciated from the foregoing description, the potential misalignment problem associated with attempting to combine respective mutually orthogonally polarized light beams transported over a variable fiber separation dual capillary structure is successfully remedied in accordance with the present invention by a tunable PM fiber combiner, which is configured to be adjustably and accurately aligned with each of the optical fibers. The resulting composite light beam may then be readily coupled to a downstream unitary beam processing device, such as a Raman amplifier.

While we have shown and described a number of embodiments of the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. An optical beam combining architecture for combining first and second non-collimated, mutually orthogonally polarized light beams, coupled thereto over polarization maintaining (PM) optical fibers whose mutual spatial separation may vary, into a single fiber for application to a downstream single beam processing device, said architecture comprising first and second birefringent walk-off crystal elements coupled in beam travel directions of said first and second mutually orthogonally polarized light beams and being displaceable relative to one another, so that the combined walk-off effect of said crystal elements is adjustable and compensates for variations in said mutual spatial separation of said PM optical fibers, and thereby brings said mutually orthogonally polarized light beams into coincidence for transport over said single fiber.

2. The optical beam combining architecture according to claim 1, wherein said PM optical fibers are respective fibers of a dual Panda-eyed capillary structure.

3. The optical beam combining architecture according to claim 1, wherein said first and second birefringent walk-off crystal elements respectively comprise first and second birefringent walk-off crystal wedges.

4. The optical beam combining architecture according to claim 3, wherein said first and second birefringent walk-off crystal wedges are linearly translatable relative to one another.

5. The optical beam combining architecture according to claim 1, wherein said first and second birefringent walk-off crystal elements are rotationally translatable relative to one another.

6. The optical beam combining architecture according to claim 5, wherein said first and second birefringent walk-off crystal elements comprise 45° crystal elements.

7. The optical beam combining architecture according to claim 6, wherein said PM optical fibers are respective fibers of a dual Panda-eyed capillary structure having mutually orthogonal Panda-eyes spatially oriented at +45° and −45° relative to a line passing through their respective fiber cores.

8. The optical beam combining architecture according to claim 7, wherein said PM optical fibers of said dual Panda-eyed capillary structure have a nominal fiber core separation $D_o$, and wherein each of said 45° crystal elements has a thickness that provides a nominal walk-off of $1.414*D_o$ for a prescribed beam polarization orientation relative to respective walk-off axes between beam input and exit output faces thereof.

9. The optical beam combining architecture according to claim 8, wherein said 45° crystal elements are rotationally adjustable, so that, for a larger than nominal separation ($D>D_o$), said crystals are rotated to increase the angle between their walk-off axes and a line through said cores to values larger than +/−45°, and thereby realize coincident overlap of said mutually orthogonally polarized light beams at an increased distance walk-off axis intersection location, and for a smaller than nominal separation ($D<D_o$), said crystals are rotated to decrease the angle between their walk-off axes and said line through said cores to values smaller than +/−45°, so as to realize coincident overlap of said two mutually orthogonally polarized light beams at a relatively closer than nominal walk-off axis intersection location.

10. A method for combining first and second non-collimated, mutually orthogonally polarized light beams transported over polarization maintaining (PM) optical fibers, whose mutual spatial separation may vary, into a single fiber for application to a downstream single beam processing device, said method comprising the steps of:
 (a) placing first and second birefringent walk-off crystal elements in beam travel directions of said first and second mutually orthogonally polarized light beams; and
 (b) controllably displacing said first and second birefringent walk-off crystal elements relative to one another, so as to adjust the combined walk-off effect of said crystal elements and thereby compensate for variations in said mutual spatial separation of said PM optical fibers, and bring said mutually orthogonally polarized light beams into coincidence for transport over said single fiber.

11. The method according to claim 10, wherein said PM optical fibers are contained in a dual Panda-eyed capillary structure.

12. The method according to claim 10, wherein said first and second birefringent walk-off crystal elements respectively comprise first and second birefringent walk-off crystal wedges.

13. The method according to claim 12, wherein step (b) comprises linearly translating said first and second birefringent walk-off crystal wedges relative to one another.

14. The method according to claim 10, wherein step (b) comprises rotating said first and second birefringent walk-off crystal elements relative to one another.

15. The method according to claim 14, wherein said first and second birefringent walk-off crystal elements comprise 45° crystal elements.

16. The method according to claim 15, wherein said PM optical fibers are installed within a dual Panda-eyed capillary structure having mutually orthogonal Panda-eyes spatially oriented at +45° and −45° relative to a line passing through their respective fiber cores.

17. The method according to claim 16, wherein said PM optical fibers are respective fibers of a dual Panda-eyed capillary and wherein said PM optical fibers of said dual Panda-eyed capillary structure have a nominal fiber core separation $D_o$, and wherein each of said 45° crystal elements has a thickness that provides a nominal walk-off of $1.414*D_o$ for a prescribed beam polarization orientation relative to respective walk-off axes between beam input and exit output faces thereof.

18. The method according to claim 17, wherein step (b) comprises, for a larger than nominal separation ($D>D_o$), rotating said crystals to increase the angle between their walk-off axes and a line through said cores to values larger than +/−45°, and thereby realize coincident overlap of said mutually orthogonally polarized light beams at an increased distance walk-off axis intersection location, and for a smaller than nominal separation ($D<D_o$), rotating said crystals to decrease the angle between their walk-off axes and said line through said cores to values smaller than +/−45°, so as to realize coincident overlap of said two mutually orthogonally polarized light beams at a relatively closer than nominal walk-off axis intersection location.

* * * * *